United States Patent
Reid et al.

[15] 3,668,406
[45] June 6, 1972

[54] LIGHT PROCESSING DEVICE UTILIZING BEAMSPLITTER HAVING FIRST REGION REFLECTIVE FROM BOTH SIDES AND SECOND REGION WHICH IS TRANSPARENT

[72] Inventors: Lee R. Reid, Richardson; Charles Sumner Williams, Dallas, both of Tex.

[73] Assignee: Texas Instruments Incorporated, Dallas, Tex.

[22] Filed: Nov. 16, 1970

[21] Appl. No.: 90,143

Related U.S. Application Data

[63] Continuation of Ser. No. 757,371, Sept. 4, 1968, abandoned.

[52] U.S. Cl. ..........................250/220 SD, 350/172, 356/13
[51] Int. Cl. .................G01c 3/14, G02b 27/14, H01j 39/12
[58] Field of Search ............................356/13, 106; 350/172; 250/220 SD

[56] References Cited

UNITED STATES PATENTS

| 587,443 | 8/1897 | Konig | 350/172 |
| 1,603,331 | 10/1926 | Downey | 350/172 |
| 1,662,693 | 3/1928 | Astafiev | 350/172 |
| 2,151,631 | 3/1939 | Williams | 356/113 |

*Primary Examiner*—James W. Lawrence
*Assistant Examiner*—T. N. Grigsby
*Attorney*—Samuel M. Mimms, Jr., James O. Dixon, Andrew M. Hassel, Harold Levine and John E. Vandigriff

[57] ABSTRACT

Disclosed is an interferometer using therein a beamsplitter having a thin-film, transparent substrate; a plurality of stripes, each stripe being reflective from both sides and affixed to the substrate; and two mirrors positioned such that as a wavefront of light is divided by the beamsplitter, the divided beams impinge upon the mirrors, whereby when one mirror is moved toward or away from the beamsplitter, the beams impinging upon the movable mirror are changed in phase from the beams impinging upon the other mirror, the phase being measured by a light detector.

6 Claims, 4 Drawing Figures

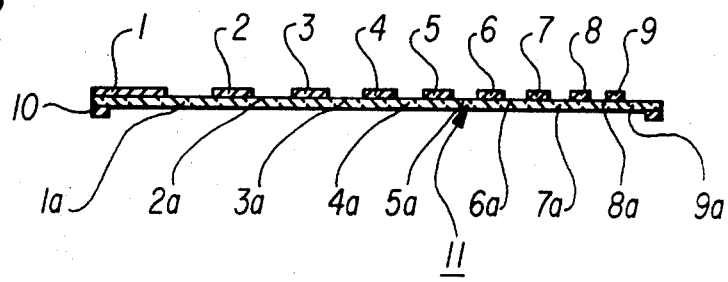
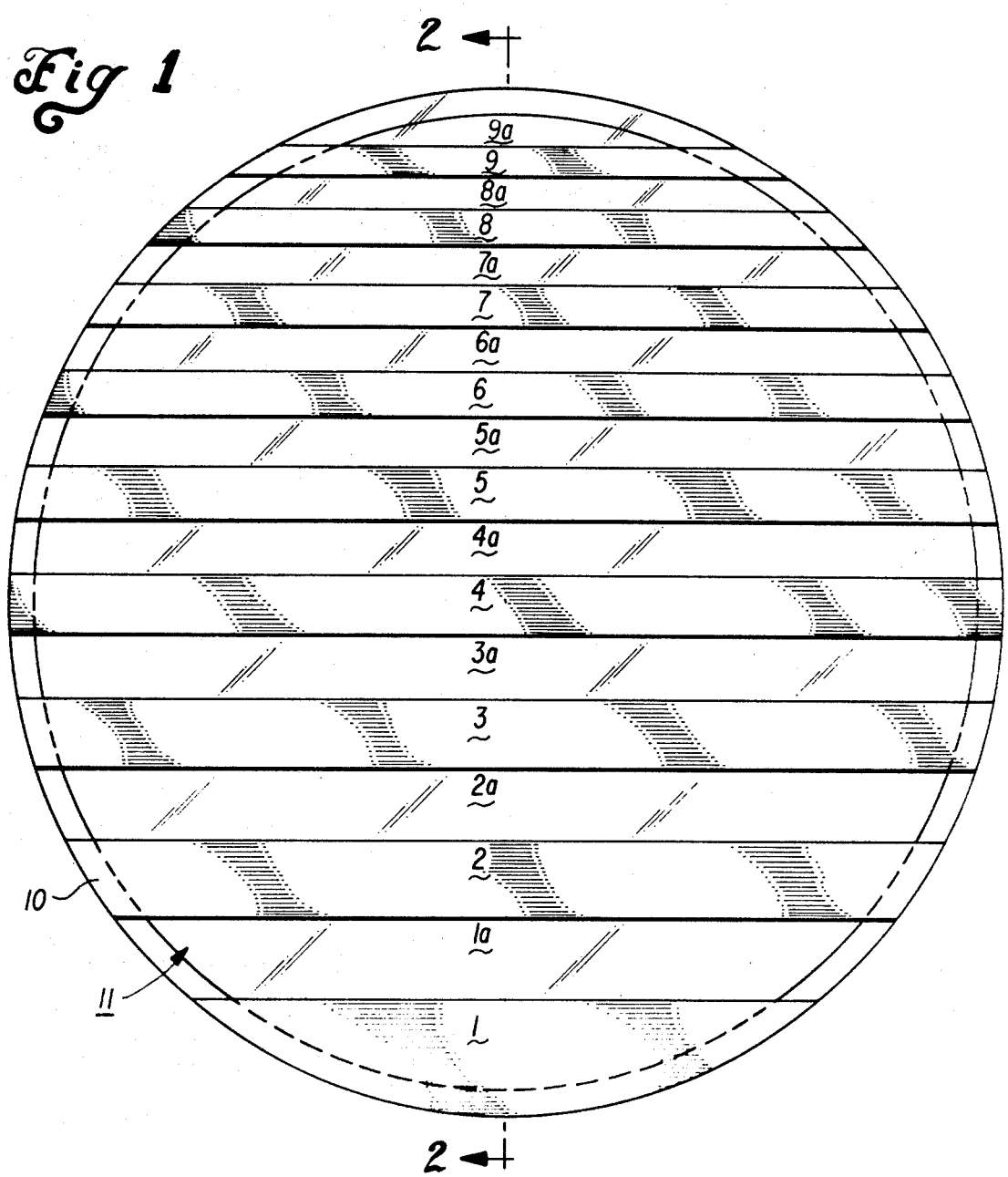

LIGHT PROCESSING DEVICE UTILIZING BEAMSPLITTER HAVING FIRST REGION REFLECTIVE FROM BOTH SIDES AND SECOND REGION WHICH IS TRANSPARENT

This application is a continuation of my prior application Ser. No. 757,371, filed Sept. 4, 1968, now abandoned.

This invention relates to improvements in optical devices and more particularly to a new thin-film, wavefront-dividing beamsplitter.

In general, a beamsplitter is a device which divides (or splits) a beam of light incident upon it into two portions, ideally each portion being of equal strength or amplitude. For example, most commonly used beamsplitters comprise a surface having particular optical properties which make the surface half reflective and half transmissive to a beam of light incident upon it, so that when a beam of light does impinge on the surface, one-half of it passes through the beamsplitter, and the other half is reflected. Generally, if the beamsplitter is positioned at an angle of 45° to an impinging beam of parallel rays, as from a light source at infinity, for example, the reflected and transmitted beams will be at an angle of 90° to each other.

Beamsplitters are most commonly used in interferometers, devices which utilize the phenomena of light interference for precise determinations of wave length, spectral fine structure, indices of refraction, and small linear displacements. When used in an interferometer, the beamsplitter is used in conjunction with reflecting surfaces, one of which can be moved such that the phase of one beam can be modified with respect to the other beam, so that changes in the relative phase difference between the two waves can be determined. In a commonly used interferometer, a mirror is provided for each beam to reflect it back to the beamsplitter at such an angle that after being again reflected from or transmitted through the beamsplitter, the two beams, initially at an angle of 90° to each other, travel in parallel paths, thus enabling their relative phase difference to be determined.

In operation, the portion of the beam which was first reflected from the beamsplitter is reflected by a first reflective surface back onto the beamsplitter where it is again divided. Upon again being divided, one half of the twice reflected light then passes through the beamsplitter in the direction of a detector and one half is reflected toward the original light source. The beam of light which was first transmitted through the beamsplitter is reflected by a second reflecting surface onto the back side of the beamsplitter, one half of the beam then being reflected to the detector in a path parallel to the first reflected beam, and one half being transmitted toward the original light source. The second reflecting surface is generally linearly movable towards and away from the beamsplitter to change the phase of the first transmitted beam from that of the first reflected beam by a measured, proportional amount. One use of the apparatus, therefore, is to determine lengths of objects very accurately which otherwise could not be physically measured, or it can be used in many other so-called "ray error" measurements.

Although the merits of the partially-reflecting beamsplitter above briefly described are abundant, it nevertheless has several disadvantages. In the above description, for example, the light which is either reflected or transmitted in the direction of the initial light source is wasted. The maximum theoretical efficiency of the beamsplitter is, therefore, 50 percent, and actual efficiencies are much lower on the order of 6 percent to 11 percent.

Also, the bandwidth, the range of wavelengths of light that the above-described beamsplitter will pass without substantially reducing the output amplitude, is limited, mainly because of light absorption within the beamsplitter material. Furthermore, the commonly used beamsplitters are incapable of passing light in the infrared wavelength range. This limits their use in interferometer spectrometers, as more particularly described below.

Finally, in most partially reflecting beamsplitters, compensator plates are required, since light waves when passing from one medium to another, change velocity and direction. This is demonstrated by the familiar example of looking at a fish in a pond: the fish appears to the observer to be in a position lower than it actually is because of the difference in velocity of light waves in air and in water. Most partially reflecting beamsplitters have a thickness which is longer than a single wavelength of light. The change in velocity is different for different wavelengths so that the optical path difference between the two beams (the reflected and transmitted beam) varies with wavelength. The purpose of the compensator plate is to introduce the same change in velocity along equal distances for the two beams.

Accordingly, it is an object of the invention to provide a beam-splitter which has an increased efficiency.

It is a further object to provide a beamsplitter which has a relatively wide bandwidth.

It is yet a further object to provide a beamsplitter which can be used in interferometer spectrometers operated at wavelengths in the infrared region of the electromagnetic radiation spectrum.

It is a still further object to provide a beamsplitter which does not require the use of a compensator plate.

Other objects, features and advantages of the invention will become apparent to those skilled in the art from the following detailed description when read in conjunction with the appended claims and attached drawings.

FIG. 1 is a plan view of one embodiment of the beamsplitter of the invention;

FIG. 2 is a cross-sectional view along line 2—2 in FIG. 1 of a cut-away portion of the mounting ring, pellicle and reflecting stripes used in the beamsplitter of the invention;

Figure 3:
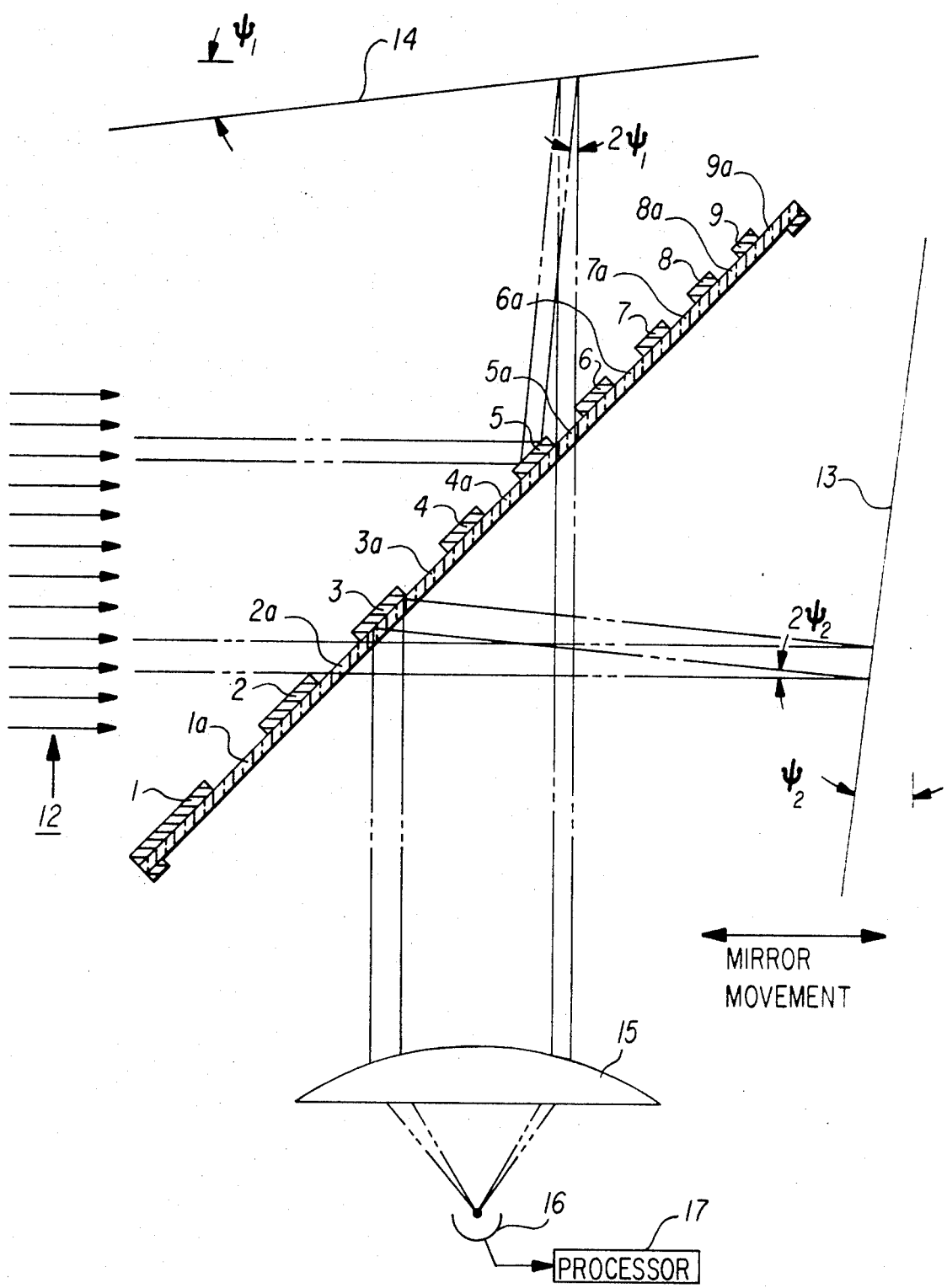
FIG. 3 is a diagrammic view of the beamsplitter used in conjunction with reflective surfaces for use in applications such as in interferometers.

In accordance with the present invention, a beamsplitter is presented which, unlike the above-described partially reflecting beamsplitter, operates on the theory of wave front division. Whereas in the partially reflective beamsplitter the incident beam is divided by amplitude. The beamsplitter of the present invention operates on the wavefront division theory, that is, the incident wave is divided into two beams, one entirely reflected and one entirely transmitted through the beamsplitter.

The beamsplitter of the invention achieves the wavefront division of a beam of light by a series of stripes, each being reflective on both sides, mounted on a thin transparent substrate, such as a thin film pellicle. Hence, as a light wave is incident upon the beamsplitter, that portion of the wave incident on the reflective stripes is entirely reflected and that portion which is incident on the pellicle is entirely transmitted therethrough. When used in an interferometer, widths of the reflective stripes and the distances between each of them can be arranged so that the two beams created by the beamsplitter can be reflected back to the beamsplitter by two mirrors, and, theoretically, all of the light of both beams is redirected by the beamsplitter into parallel paths in the direction of a light detector to record the intensity of the combined beams. Since light waves of different phase interfere additively or subtractively to make a light beam having its amplitude determined by the amount of phase difference, a light amplitude detector may be used.

The base of the beamsplitter of the invention is a mounting ring 10 of, for example, quartz or other suitable material. Constructed on the quartz ring is a thin film pellicle 11, for example, a transparent membrane of a nitrocellulose base material. One method of constructing a suitable thin film pellicle of thickness, for example, of 0.3 to 3.1 microns is described in copending application, Ser. No. 497,294 now U.S. Pat. No. 3,438,694, filed Oct. 18, 1965, entitled "Beam Splitter", by Lee R. Reid et al, assigned to the assignee of the present application, and incorporated in the present application by reference. At this juncture it should be explained that the choice of pellicle thickness is of importance, as above implied, in determining the bandwidth and the need for a compensator plate. Using the pellicle described in the above-identified copending application, bandwidth extending through the infrared region and to long wavelengths of 100 microns or more can be achieved without requiring the use of a compensator plate.

From FIGS. 1 and 2, it can be seen that a plurality of reflective stripes, numbered 1 to 9, of varying widths, are spaced at various distances on the thin film pellicle 11. For convenience, the pellicle spaces between stripes are numbered 1a to 9a, each space respectively corresponding in number to one of the reflective stripes. For uses in interferometers and the like, for example, it is important that the stripes 1 to 9 be made reflective on both from the front and rear sides of the beamsplitter. To achieve the required reflectivity, the reflective stripes may be constructed, for example, by first constructing a mask having a number of openings each of a size corresponding to the size of a desired stripe, next placing the mask upon the pellicle so that the openings correspond to the desired positions of the stripes and finally, subjecting the mask to a vapor of a reflective metal such as gold, silver, or aluminum to deposit a metal band of a few hundred Angstroms thickness onto the pellicle.

The beamsplitter, in conjunction with a pair of high reflective mirrors, may then be used in an interferometer, as shown diagrammatically in FIG. 3. To be understood is that the term "mirror" as used herein refers to a "front surface" or "front reflecting" mirror. Such front reflecting mirror may be a sheet of glass coated with a reflective material such as gold, silver, aluminum, or the like on that surface of the glass on which a beam of light first impinges. Further to be emphasized is that the reflecting surface of such a mirror must be optically flat, i.e. the surface must be a true plane, for otherwise, error would be introduced into the measurements made since interferometers deal with "ray errors" or phase differences on the order of one ten billionth of a meter. Accordingly, for a definite guideline, it is generally considered that the term "optically flat" means flat within a tolerance of one-tenth wavelength of the shortest wavelength of interest.

Light rays 12 entering the interferometer, are essentially parallel as if from a light source at infinity, and strike the beamsplitter at an angle of about 45° to the plane of the beamsplitter. As the wavefront of the rays is divided at the beamsplitter, as above explained, part of said wavefront passes through the transparent areas 1a–9a of the beamsplitter to strike the reflective surface of the mirror 13, and part of said wavefront is reflected from stripes 1–9 of the beamsplitter to strike the reflective surface of the mirror 14.

The mirror 13 is positioned at an angle, $\Psi_2$, such that the portions of the wavefront which are transmitted through the transparent areas 1a–8a of the beamsplitter are reflected onto the back side of stripes 2–9. The back sides of the stripes, being reflective as already described, direct the portions of wavefront reflected from mirror 13 onto lens 15, which focuses them onto a detector 16, to be further processed, as desired, by processor 17. The mirror 13 is movable away and toward the beamsplitter as shown by the arrow, thus enabling the portions of the wavefront passing through the pellicle to be changed in phase from those reflected to mirror 14.

In a similar manner, the mirror 14 is disposed at an angle, $\Psi_1$, such that the portions of the wavefront which were first reflected from the front sides of stripes 1–9 are reflected a second time by the mirror 14 to pass through the transparent areas 1a–9a of the beamsplitter in the direction of the lens 15 to be focused upon the detector 16. To be understood is that, in general, angles $\Psi_1$, and $\Psi_2$ will be equal, but for complete description, the angles are referred to as being different.

Because of the geometrical relationship between the beamsplitter and the reflective surfaces of the mirrors 13 and 14, the stripes 1–9 deposited on the pellicle must be of different widths, each at a different spacing with relation to one another. The reason for these varying sizes and spaces can best be explained with reference to FIG. 4 in which the angles and sizes have been greatly exaggerated to illustrate the geometrical principles involved. From FIG. 4 it can be seen that rays which pass through the transparent portions 1a and 7a of the beamsplitter strike the reflective surface of the mirror 13, and are each reflected at the angle $2\theta$, which is twice the angle of the reflective surface 13 from a plane perpendicular to the direction of travel of the light waves. In order that all of the light reflected from the reflective surface of the mirror 13 impinge upon the back sides of stripes 2 and 8 to be reflected to the detector, the light ray passing just on top of stripe 1 must be reflected from the mirror 13 to just impinge on the bottom edge of the back side of he stripe 2. Likewise, the light ray passing just above the stripe 7 must be reflected from the mirror 13 to impinge just on the bottom edge of stripe 8. Since the mirror 13 reflects both of the light rays incident upon it at the same angle, and since the distance for the light ray passing through opening 7a to reflective surface 13 (denoted by the symbol $l_{h2}$), the height above the horizontal path of the light beam when the reflected beams again strike the beamsplitter will be less for the beam passing through opening 7a than for the beam passing through 1a. Geometrically, it can be seen that each of the respective beams will be reflected upwards a distance $l_{h1}2\theta$, (assuming $\theta$ to be very small) and since $l_{h2}$ is smaller than $l_{h1}$ for all the light passing through opening 7a to impinge of the back side of stripe 8, stripe 8 must be mounted on the pellicle at a distance from stripe 7 which is smaller than the distance stripe 1 is from stripe 2. Since the transparent spaces 1a–9a are of decreasing width, so must the stripes 1–9 in order that all the light which passes through the spaces shall fall upon the back side of the stripes.

Similar consideration should be given the reflecting light waves from the reflective surface 14. In order for the light waves reflected from the mirror 14 to emerge from the beamsplitter in a path parallel to the light waves reflected from the back sides of the stripes, the mirror 14 must be disposed at the same angle $\theta$ as the mirror 13, so that light waves reflected from the stripe 1, for example, will pass through the transparent space 1a after being reflected from the mirror 14. From the above discussion of the size and spacing requirements imposed by the mirror 13, it is concluded that the sizes and spaces must be of decreasing size as the distance between the mirror 13 and the beamsplitter is decreased. Therefore, the space 1a must be of size smaller than stripe 1, the same being true of all the other stripes and associated spacings.

The above discussion implies that the actual number and size of the stripes and their associated spacings effect the most efficient operation. The following stripe sizes and spaces are illustrated for a pellicle of the kind shown in FIGS. 1 and 2.

| Stripe 0 | Width | Space 0 | Width |
|---|---|---|---|
| 9 | 0.090 in. | 9a | 0.084 in. |
| 8 | 0.103 | 8a | 0.096 |
| 7 | 0.118 | 7a | 0.110 |
| 6 | 0.135 | 6a | 0.126 |
| 5 | 0.154 | 5a | 0.144 |
| 4 | 0.176 | 4a | 0.165 |
| 3 | 0.201 | 3a | 0.188 |
| 2 | 0.228 | 2a | 0.214 |
| 1 | 0.259 | 1a | 0.243 |

A beamsplitter having stripes and spacing of such dimensions as above would be used in conjunction with reflecting surfaces such as reflecting surfaces of the mirror 13 and 14 shown in FIG. 3, each reflecting surface being spaced at about 1.9 inches from the geometrical center of the beamsplitter, and being disposed at an angle of about 1° 53' from a plane perpendicular to the direction of travel of the light waves impinging upon it.

It should also be emphasized that the above dimensions, though illustrative, are arbitrary and given only by way of example. The primary purpose for setting forth the above date is to visualize the relative size relation between the stripes and spaces. For example, any one arbitrary stripe or space could be chosen, and from the relation above given, the rest of the stripes and spaces can be determined. Furthermore, the reflective surface need not be restricted to stripes, but could be, for example, of checkerboard, or other suitable pattern.

In interferometer spectrometer applications, it is necessary for one of the reflective surfaces 13 or 14 to be movable with respect to the beamsplitter in order to change the phase of one of the two beams created by the beamsplitter, so that the beams of different phase, when rejoined at the detector, will either additively or subtractively interfere to increase or decrease respectively, the amplitude of the light upon the detector. It can be seen, therefore, that very small movements of reflective surface 13 may cause large changes in amplitude of the detected light output. The device, then, can be used for very delicate and sensitive measurements.

Figure 4:
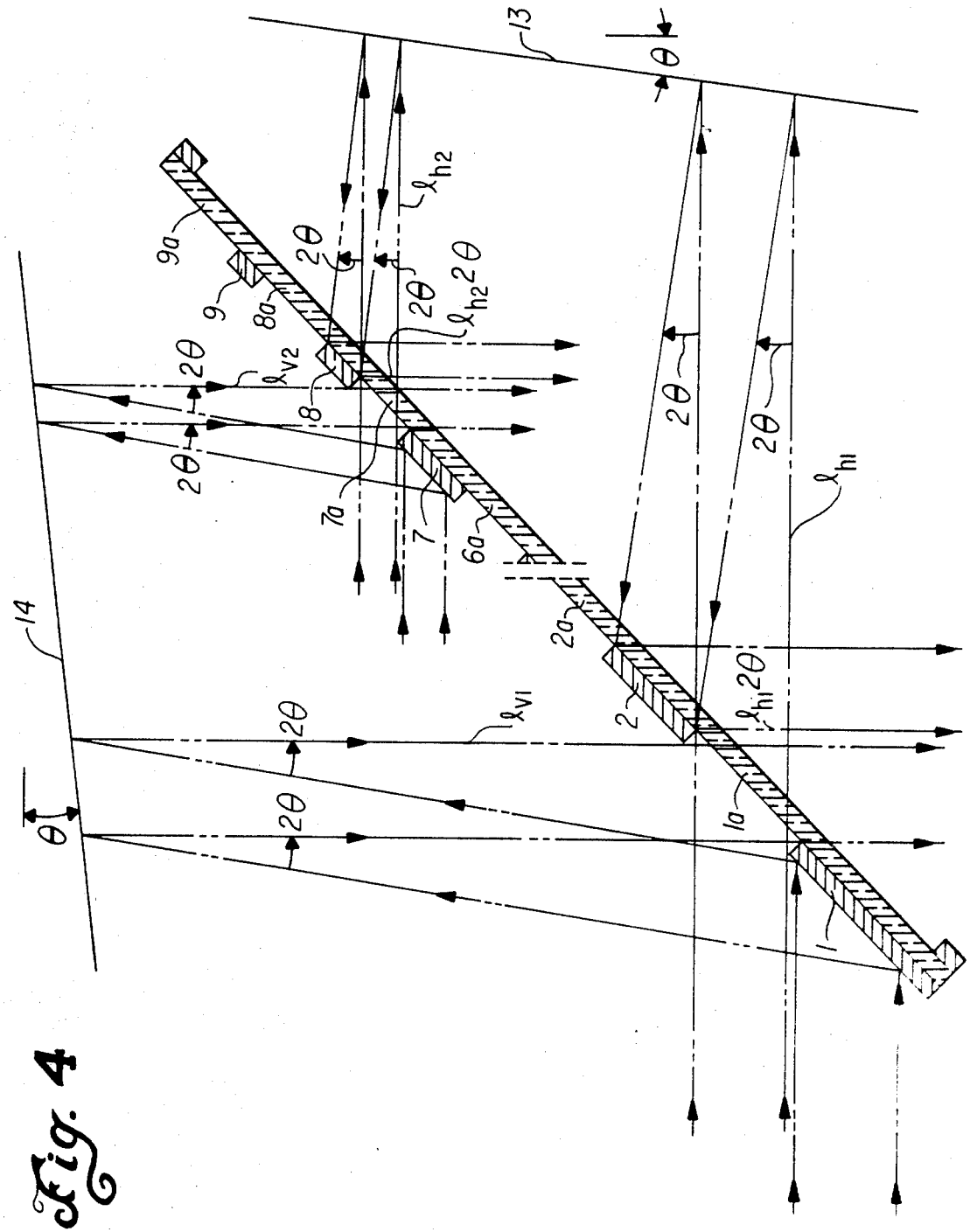
FIG. 4 is a diagrammic view of a cut-away portion of the beamsplitter of the invention showing the geometrical considerations involved in determining the size and spacing of the reflective stripes.

Unlike amplitude division beamsplitters where the efficiency is dependent, in part, on the ability of the beamsplitter to pass part of the beam and reflect part of the same beam, the present invention relies only on the reflective properties of the beamsplitter for its operation, the beams impinging upon the transparent portions of the beamsplitter being unaffected since those beams only and totally pass through the transparent portions, nothing being reflected. In other words, whereas the amplitude division beamsplitters performed both reflecting and transmitting functions on the incident beams simultaneously, the beamsplitter of the invention performs only one function at a time: reflecting all of a given portion of the incident beam from the front or back sides of reflective stripes 1–9 or transmitting in all of a different portion of the incident beam through transparent areas 1a–9a of the beamsplitter pellicle, as shown in FIG. 4. Hence, since all the light beams are directed in the desired direction by the entirely transmitting and entirely reflective portions of the beamsplitter, substantially no light is wasted.

It can be seen, also, that the efficiency of the beamsplitter of the invention is dependent on the amount of light reflected from surface 14 which "misses" or does not impinge on transparent areas 1a–9a to be transmitted therethrough to the detector, and, also, on the amount of light from reflective surfaces 13 which "misses" the back sides of reflective strips 1–9 to be transmitted to the detector. These losses increase as mirror 13 is moved in operation of the interferometer, but the losses are very small in comparison to the losses involved in the previously used amplitude beamsplitters; the theoretical efficiency of an interferometer as shown in FIG. 3 can be made to approach 100 percent.

Also, because the beamsplitter operates only on the theory of reflection, the primary limitation on its bandwidth is the thickness and transmittance of the thin film pellicle. As mentioned, above, a pellicle on the order of 0.5 micron in thickness will pass light wavelengths from the visible through the infrared range and to wavelengths up to and beyond 100 microns. Furthermore, because the pellicle is so thin, the amount a beam is offset in passing through it is very small; hence, a compensator plate is not required to correct the beam. It must be emphasized, however, that in the interferometer applications contemplated, the pellicle and reflective stripes thereon must be of the same optical flatness as the above described front reflecting mirrors.

Because of the particular ability of the beamsplitter of the invention to pass light waves in the infrared region, of special importance are its applications in interferometer spectrometers, devices which are used to determine electromagnetic spectra using conventional interferometer techniques. Such spectrometers may be used, for example, for determining the composition of the atmosphere of the earth by placing an interferometer spectrometer in a satellite, measuring the spectrum of light radiated from the surface of the earth, and determining which wavelength of light is absorbed by the atmosphere. By such analysis, together with the knowledge of the absorption characteristics of each of the various elements, the composition of the atmosphere can be very accurately determined both as to whether certain elements exist in the atmosphere and the quantities of those elements which do exist. Of particular importance are measurements in the infrared light range since the majority of radiation from the earth are in the infrared region, and which, as above explained, presently used interferometer spectrometers cannot analyze for lack of a beamsplitter capable of handling infrared light waves. The beamsplitter of the present invention, however, overcomes this problem, since it is capable of passing the wavelengths of at least one hundred microns. An additional advantage of the beamsplitter of the invention is that, because it is either entirely reflecting or entirely transmitting, it is practically free from errors introduced by non-linear wave transmission across its intended bandwidth. This is of importance especially in accurately determining the intensity of the received spectral lines in determining the amount of the element present.

Although the invention has been described and illustrated with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. A beamsplitter processing device comprising
    a. a light detector means,
    b. a substrate having at least one area reflective on both sides and at least one area transparent from both sides, such that light impinging on said substrate will be divided into a first beam reflected from said reflective area and a second beam transmitted through said transparent area,
    c. a first reflecting means positioned to reflect said first beam of light through said transparent area in the direction of said light detector means,
    d. a second reflecting means positioned as to reflect said second beam of light onto the back side of said reflective area of said substrate, such that said second beam is reflected by said reflective area of said substrate in the direction of said light detector means, said second reflecting means being movable towards and away from said substrate,
    e. whereby when said second reflective means is moved, the light amplitude at said light detector means is changed.

2. A beamsplitter processing device comprising:
    a. a transparent substrate;
    b. a plurality of stripes, each of a different width, each of said plurality of stripes being reflective on both sides, and affixed to said transparent substrate whereby successive stripes are separated by transparent areas of said substrate, each of said areas being of a different width;
    c. a first reflecting surface positioned to reflect substantially all of the light reflected from one side of each of said stripes, back through a transparent area of said substrate adjacent each of said stripes,
    d. a second reflecting surface positioned to reflect substantially all of the light transmitted through each of said transparent areas of said substrate back onto the other side of each of said stripes, adjacent respective transparent areas, said second reflective surface being movable toward and away from said transparent substrate, and
    e. means to detect the amplitude of the combined light reflected from said other side of said stripes and the light reflected from said first reflective surface passing through said transparent areas of said substrate.

3. A beamsplitter processing device comprising:
    a. a quartz mounting ring positioned at an angle of about 45° to the direction of travel of an impinging light wave;
    b. an optically flat pellicle of a nitrocellulose material of thickness between 0.3 and 3.1 microns mounted on said quartz mounting ring;

c. nine optically flat reflecting stripes of gold deposited upon both sides of said pellicle, said strips being, respectively, of widths 0.090, 0.103, 0.118, 0.135, 0.154, 0.176, 0.201, 0.228, 0.259 inch with respective spaces therebetween of 0.084, 0.096, 0.110, 0.126, 0.144, 0.165, 0.188, 0.214, and 0.243 inch;

d. a first optically flat front reflecting mirror spaced 1.9 inches from the geometrical center of the quartz mounting ring, the angle of the plane of said first reflecting mirror being 43° 07' from the plane of the pellicle, whereby light reflected from the front side of each of said stripes is reflected by said first mirror onto said spaces adjacent each of said stripes;

e. a second optically flat front reflecting mirror movable toward and away from said quartz mounting spaced 1.9 inches from the geometrical center of the quartz mounting ring, the angle of the plane of the second reflecting mirror being 43° 07' from the plane of the pellicle, whereby light first impinging on respective spaces between said stripes is transmitted therethrough to said second mirror thereby to be reflected by said second mirror onto the back side of respective stripes adjacent said spaces;

f. a light gathering lens in the path of the light beams reflected from the back side of said stripes and transmitted through said spaces after first having been reflected from said first mirror;

g. a light sensitive detector spaced from said light gathering lens such that the light output from the lens strikes said detector;

h. whereby movements of said second mirror toward or away from said mounting ring a measured distance produces a proportional change in amplitude of light falling on said light sensitive detector.

4. A beamsplitter light processing device comprising in combination:

a. a transparent substrate;

b. a source of light impinging upon one surface of said substrate;

c. a plurality of spaced stripes selectively affixed to said substrate having selectively variable widths and being selectively reflective on both sides, said stripes being separated by transparent areas of said substrate with said transparent areas having selectively variable widths;

d. first means for detecting amplitude characteristics of the light passing through said transparent areas of said substrate;

e. second means for directing light impinging on said transparent areas toward said first means; and f. third means for directing light impinging on one surface of said stripes toward said first means; whereby g. said first means produces a signal that represents the relative optical characteristics of the light impinging on said transparent areas and the light impinging on said one surface of said stripes.

5. A beamsplitter light processing device comprising in combination:

a. mounting means having a transparent pellicle affixed thereto;

b. a source of light impinging upon one surface of said pellicle;

c. a plurality of spaced stripes selectively affixed to said one surface of said pellicle having selectively variable widths and being selectively reflective on both sides, said stripes being separated by transparent areas of said pellicle with said transparent areas having selectively variable widths;

d. light detecting means for producing signals representing selected optical characteristics of the light passing through said pellicle;

e. first movable means for directing light impinging on said one surface of said pellicle and passing through said transparent areas toward said stripes, whereupon said light is reflected toward said light detecting means; and f. second movable means for directing light impinging on said one surface of said pellicle and reflected by said stripes toward said transparent areas, whereupon said light passes through said transparent areas and impinges on said light detecting means.

6. A beamsplitter light processing device comprising in combination:

a. a mounting ring of quartz having a transparent pellicle of nitrocellulose material affixed thereto;

b. a source of light impinging upon one surface of said pellicle;

c. a plurality of spaced stripes selectively affixed to said one surface of said pellicle having selectively variable widths and being selectively reflective on both sides, said stripes being separated by transparent areas of said pellicle with said transparent areas having selectively variable widths;

d. means for detecting amplitude characteristics of the light passing through said transparent areas of said pellicle;

e. first means for directing light impinging on said one surface of said pellicle and passing through said transparent areas toward said detecting means; and f. second means for directing light impinging on said one surface of said pellicle and reflected by said stripes toward said detecting means; whereby g. said detecting means produces signals representing selected optical characteristics of the light impinging on said transparent areas and the light impinging on said stripes.

* * * * *